United States Patent [19]

Huffman

[11] Patent Number: 4,612,204

[45] Date of Patent: Sep. 16, 1986

[54] INCORPORATION OF A CLOUDING AGENT INTO A DRY BEVERAGE MIX

[75] Inventor: Connie K. A. Huffman, Port Hope, Canada

[73] Assignee: General Foods Inc., Don Mills, Canada

[21] Appl. No.: 712,591

[22] Filed: Mar. 15, 1985

[51] Int. Cl.[4] ............................................. A23L 2/38
[52] U.S. Cl. ..................................... 426/590; 426/658
[58] Field of Search ............ 426/590, 575, 577, 330.3, 426/285, 519, 443, 453, 106

[56] References Cited

U.S. PATENT DOCUMENTS

| | | |
|---|---|---|
| 3,658,552 | 4/1972 | Carlson et al. ................. 426/590 |
| 4,187,326 | 2/1980 | Serafino et al. ................ 426/590 |
| 4,508,740 | 4/1985 | McSweeney .................... 426/590 |
| 4,529,613 | 7/1985 | Mezzino et al. ................ 426/590 |

*Primary Examiner*—Raymond N. Jones
*Assistant Examiner*—Carolyn Paden
*Attorney, Agent, or Firm*—Linn I. Grim; Thomas A. Marcoux; D. J. Donovan

[57] ABSTRACT

A process is provided for incorporating finely divided titanium dioxide as a clouding agent into a dry mix beverage so that on reconstitution of the dry mix, a permanent cloud will develop.

16 Claims, No Drawings

INCORPORATION OF A CLOUDING AGENT INTO A DRY BEVERAGE MIX

BACKGROUND OF THE INVENTION

1. Field of the Invention

The present invention relates to a process for incorporating finely divided titanium dioxide as a clouding agent into a dry beverage mix so that on reconstitution of the dry mix a permanent cloud will develop.

2. Description of the Prior Art

In the art of the formulation of dry mix fruit flavored beverages, there is a continuing effort being made to duplicate a counterpart natural fruit juice as closely as possible. The imitation beverage must have the mouth-feel, opacity, color and flavor characteristics of a natural juice. These desirable characteristics must be evident from the time of preparation of the aqueous beverage from the dry mix to the time of consumption. In many cases the beverage is not consumed for periods of time up to 48 hours subsequent to preparation. While stability after reconstitution is critical, it is equally important that the powderous dry beverage mix be storage stable for extended periods of time.

An attempt at achieving the desired property of opacity or cloud inherent in natural fruit juice is described in U.S. Pat. No. 3,023,106 to Common. Therein is described a dried emulsion incorporating a plastic fat which is added to a dry beverage mix. The term "plastic fat" is described to cover a fat which is semi-solid at room temperature, that is, a product which is a mixture of fats and oils at temperatures in the order of 60° F. The plastic fat may be compounded by any one of a number of means such as by hardening through hydrogenation of vegetable oils or may comprise a blend of such fats and oils. Typically coconut oil may be hydrogenated to give a semi-solid material having a Wiley melting point of 98° F., a capillary melting point of 104° F., an iodine value of 5.2, a saponification number of approximately 253 and solids content index of 43% at 20° C. To this material is added 6% stearin to yield a partially solidified fat having a Wiley melting point of 111° F., a capillary melting point of 116° F., an iodine value of 2.2, a saponification number of approximately 254 and a solids content index of from 48–50% solids at a temperature of 20° C.

An attempt at producing a clouding agent was set out in U.S. Pat. No. 3,658,522 to Carlson. The concept of a plastic fat emulsion system of Common was improved upon by providing for the incorporation of one or more inorganic whitening pigments, typically titanium dioxide, in a clouding system comprising a plastic fat and a hydrophilic colloidal material. Carlson typically spray dries a solution of gum arabic, hydrogenated coconut oil and titanium dioxide to obtain a dry, flowable, powderous clouding agent which is subsequently incorporated in a dry beverage mix.

A major drawback of prior cloud systems relates to their inclusion of the plastic fat itself in the cloud system. Several detrimental effects are manifested due to the fact and result ultimately in problems of clumping of the dry mix and insolubility of the mix when reconstitution is attempted. First, the oil may be poorly fixed, that is an excess of free oil will be present in the cloud system. Second, in the blending process when the cloud is mixed with the other ingredients of the dry beverage mix ingredients, considerable mechanical work is performed (typically in 2,000 pound capacity ribbon blenders). The mechanical attrition and grinding will liberate oil from its fixative agent. A third undesirable effect is caused by temperature which may be due to both mechanical shear during mixing and ambient conditions. A fourth effect is provided by excessive moisture which may be due to excessively humid ambient conditions and the addition of liquid color to the dry mix. Thus, there are various influences which tend to liberate oil during processing. Since the oil is water insoluble, aqueous reconstitution is incomplete.

Another problem associated with the use of oil in a clouding agent is off-taste. The oxidative rancidity and alkaline hydrolysis of the oil result in an undesirable soapy taste. This type of problem is further compounded in that discovery of the off-taste in many instances is not made until after the product has been in the stream of commerce for a considerable period of time.

To overcome these problems, U.S. Pat. No. 4,187,326 to Serafino et al. describes preparing a dry clouding agent for dry beverage mixes by co-drying an aqueous mixture containing a major amount of solubilized maltodextrin with minor amounts of xanthan gum and dispersed titanium dioxide. The dry product produces a clouding effect when incorporated in an artifical beverage. This requires an additional step of blending, mixing and drying titanium dioxide with additional compounds to insure permanent titanium dioxide dispersion in the ready-to-drink beverage. This patent indicates that the combination of each component by mixing in a dry form does not have utility.

A new process has been discovered wherein titanium dioxide without pretreatment such as codrying can be mixed in a dry beverage mix and on reconstitution of the beverage mix, the titanium dioxide will be permanently dispersed in the reconstituted beverage.

SUMMARY OF THE INVENTION

A process has been discovered for incorporating titanium dioxide into a dry beverage mix whose ingredients comprise a sweetener, food acid, flavor, color and the like wherein the titanium dioxide will provide a permanent cloud in the reconstituted beverage obtained from the total dry beverage mix. The process involves the intimate mixing of finely divided titanium with the beverage mix ingredients in the presence of a finely divided hydrocolloid gum until a substantially uniformly dispersed product is obtained. A preferred method is the dry intimate mixing of the beverage mix, free of sweetener, with finely divided titanium dioxide and finely divided hydrocolloid gums forming a premix and further intimately mixing the premix with sugar to produce a substantially uniformily dispersed product which on reconstitution provides a permanent titanium dioxide cloud in the reconstituted beverage.

DETAILS OF THE INVENTION

In the present invention, the ingredients of the dry beverage mix, used herein, are intimately mixed or blended under high shear using various types of mixers such as a ribbon blender, sigma mixer, flow mixer or other stirring or tumbling mixers. The amount of mixing must be sufficient so that an intimate blend of dry beverage mix is obtained. This means that when the mixing is completed, each portion of the mix has substantially the same quality of ingredients in the dispersed mix and the ingredients are uniformly dispersed in the beverage product. Sufficient mechanical mixing is necessary to achieve the desired beverage mix.

The dry beverage mix ingredients as used herein include food acids such as citric acid, malic acid, adipic acid, fumaric acid, tartaric acid, succinnic acid and the like. Other ingredients include sugars such as sucrose, dextrose, fructose and the like and other artificial sweeteners such as saccharin, cyclamate, dihydrochalcone, aspartame and the like. Suitable coloring agents such as orange coloring, cherry coloring, grape coloring and the like are used. Similarily fruit flavors such as orange, grape, lemon, lime and the like are also used herein. Other art recognized beverage additives used herein are flavor enhancers and flow conditioners such as calcium phosphates including monocalcium phosphate, tricalcium phosphate and the like. All these beverage mix ingredients are used in amounts known to the art to achieve the desired result.

The titanium dioxide as used herein is a purified food grade inorganic white named by the 1971 Color Index pigment white 6, C.I. 77891. The titanium dioxide is used in the dry mix in amounts from about 0.01 to about 0.20 weight percent, preferably from about 0.025 to about 0.1 weight percent of the total composition. In the aqueous reconstituted beverage, the amount of titanium dioxide used is about 0.0011 to about 0.023 weight percent, preferably about 0.0028 to about 0.0114 weight percent of the total. The size of the finely divided titanium dioxide is from about 0.1 micron to about 7.0 microns in particle size. The titanium dioxide used typically has the following characteristics:

| Crystal Type: | Anatase |
|---|---|
| Specific Gravity: | 3.9 |
| Pounds per Solid Gallon: | 32.5 |
| 1 Pound Bulks, Gals.: | .0308 |
| Minimum TiO$_2$: | 99% |
| Spatula Water: | 30 lbs water/100 lbs Pigment |
| Spatula Oil Absorption: | 20–22 lbs oil/100 lbs Pigment |
| Average Particle: | 0.3 Microns |
| Screen Test: | 99% Through 325 Mesh Screen |
|  | 100% Through 200 Mesh Screen |
|  | (CTFA Method C 6-1, Wet Screening) (ASTM D-185-45) |

The hydrocolloid gums used herein are those which exhibit the colloidal properties of remaining suspended under the influence of gravity and not being visible under microscopic examination. The hydrocolloid gums used in this invention actually form molecular solutions in most instances. The hydrocolloid gums used herein are edible and will readily suspend titanium dioxide in a water based beverage. An important functional quality of the hydrocolloid gum is its ability to control aqueous fluid rheology. Water solutions of the hydrocolloid gum such as xanthan are extremely pseudoplastic; when shear stress is applied, viscosity is reduced in proportion to the amount of shear once the yield point has been exceeded. Upon release of the shear, total viscosity recovery occurs almost instantaneously. As has been stated above, the hydrocolloid gum that is used herein must be useful as a suspension stabilizer having an appropriate yield value, good taste and mouthfeel but also have a viscosity which is almost independent of temperature and functional at the pH of beverages. The hydrocolloid gums suitable for use include pectin, guar, locust bean, xanthan, and the like as well as cellulose derivatives such as sodium carboxymethylcellulose, methylcellulose, hydroxypropylcellulose, hydroxypropylmethylcellulose and the like. The preferred hydrocolloid gums include pectin, xanthan, and a combination of xanthan and sodium carboxymethylcellulose. The amounts of hydrocolloid gums used herein range from about 0.01% to about 0.4%, preferably about 0.015% to about 0.2% by weight of the total dry beverage mix composition. The amounts of hydrocolloid gums used in the aqueous reconstituted beverage range from about 0.0011 to about 0.045 weight percent, preferably from about 0.0017 to about 0.023 weight percent of the total beverage.

The combination of the titanium dioxide and the hydrocolloid gum in the reconstituted beverage as used in the invention provides a permanent cloud in the beverage. A permanent cloud is one permitting a cloud i.e. a titanium dioxide dispersion which maintains opacity, does not settle and is useful in a beverage for periods of at least 24 hours and preferably at least 48 hours when the beverage is stored at normal refrigerated temperatures.

The invention is more fully described but not limited by the following examples.

EXAMPLES

An orange flavored beverage mix is prepared in accordance with the following procedure. The following ingredients are added to a ribbon blender mixer having a mixer capacity of slightly greater than 2000 pounds and containing a motor having 20 horsepower which provides at least 33.3 revolutions per minute of the mixing blades.

|  | Lbs | Weight Percent of Total Beverage Mix (Dry) |
|---|---|---|
| Citric Acid | 1501 | 6.59 |
| Orange Flavor | 186.5 | 0.81 |
| Food Color | 13.12 | 0.057 |
| Tricalcium Phosphate | 150.0 | 0.652 |
| Ascorbic Acid | 55.3 | 0.240 |
| Sodium Carboxymethylcellulose | 50.0 | 0.217 |
| Xanthan | 24.2 | 0.105 |
| Titanium Dioxide | 19.6 | 0.085 |
| Total | 2000 lbs. | 8.686% |

The above ingredients are intimately dry mixed for 300 revolutions over a 9 minute period. This premixture is removed from the mixer. To the empty mixer is added 1600 pounds of sugar (91.30 weight percent of total mixture). Then 100 pounds of the premixture prepared above is put on top of the sugar and the product mixed for 300 more revolutions. The resulting product readily rehydrates (disperses) in water to form a uniform cloud i.e. opacity without clumps, floaters, sinkers or films. A stable suspension (i.e. does not settle) of titanium dioxide in the reconstituted beverage is achieved for at least 48 hours stored at ambient temperatures. The same result is achieved if all ingredients including sugar are mixed for 18 minutes (600 revolutions).

Another advantage of the present invention over the use of the co-dried product of U.S. Pat. No. 4,187,326 is the fact that larger particles of dry beverage mix of this invention are produced in the final product and less dusting of the mix is obtained.

On a comparative basis, a clouding agent as described in Example 2 in U.S. Pat. No. 4,187,326 to Serafino et al. a co-dried cloud of maltodextrin, xanthan gum and titanium dioxide is added to the ingredients of the beverage mix without the separate ingredients of xanthan and titanium dioxide and mixed for 18 minutes (600 revolutions). This product has a titanium dioxide opacity the same as that of the example of the present invention but the suspension of titanium dioxide is slightly better than the beverage containing the co-dried product of U.S. Pat. No. 4,187,326 (containing a small white residue on standing on the glassware) since no white residue is present on standing on the glassware of the beverage made by the process of this invention.

The amount of mixing necessary to achieve the desired beverage premix in this invention using the same quantities of material as described in the above example can be as low as 200 revolutions over a six minute period and the final mixing stage with the premix and sugar. The minimum amount of mixing can be completed in 66.66 revolutions over two minutes. The total minimum mixing of the entire amount of the above example is approximately 8 minutes (266.66 revolutions) to achieve a desired beverage mix while the optimum mixing is approximately 18 minutes (600 revolutions). The mixing time is dependent on the ingredients to be mixed.

What is claimed is:

1. In a process for incorporating titanium dioxide into a dry beverage mix whose ingredients comprise a sweetener, food acid, flavor and color to provide a uniformly dispersed product wherein the titanium dioxide will provide a permanent cloud in the reconstituted beverage obtained from the total dry beverage mix, the improvement comprising intimately dry mixing finely divided titanium dioxide with the ingredients used in said beverage mix in the presence of a finely divided hydrocolloid gum until a substantially uniformly dispersed product is obtained.

2. The process of claim 1 wherein the hydrocolloid gum is xanthan.

3. The process of claim 1 wherein the hydrocolloid gum is pectin.

4. The process of claim 1 wherein the hydrocolloid gum is carboxymethylcellulose and derivative thereof.

5. The process of claim 1 wherein the sweetener is sugar.

6. The process of claim 1 wherein the ingredients of said beverage mix, free of sweetener, are intimately mixed with finely divided titanium dioxide and finely divided hydrocolloid gum forming a premix and intimately mixing said premix with sugar to produce a substantially uniformly dispersed product.

7. The process of claim 6 wherein the hydrocolloid gum is xanthan.

8. The process of claim 6 wherein the hydrocolloid gum is a combination of xanthan and sodium carboxymethylcellulose.

9. The process of claim 1 wherein the hydrocolloid gum is present in amounts from about 0.01% to about 0.4% by weight of the total dry beverage mix composition.

10. The process of claim 1 wherein the hydrocolloid gum is present in amounts from about 0.015 to about 0.2% by weight of the total dry beverage mix composition.

11. The process of claim 1 wherein the hydrocolloid gum is present in amounts from about 0.0011 to about 0.045 weight percent of the reconstituted beverage.

12. The process of claim 1 wherein the hydrocolloid gum is present in amounts from about 0.0017 to about 0.023 weight percent of the reconstituted beverage.

13. The process of claim 1 wherein titanium dioxide is present in amounts from about 0.01 to about 0.2% by weight of the total dry beverage mix composition.

14. The process of claim 1 wherein titanium dioxide is present in amounts from about 0.025 to about 0.010% by weight of the total dry beverage composition.

15. The process of claim 1 wherein the titanium dioxide is present in amounts from about 0.0011 to about 0.023 weight percent of the reconstituted beverage.

16. The process of claim 1 wherein titanium dioxide is present in amounts from about 0.0028 to about 0.0114 weight percent of the reconstituted beverage.

* * * * *